US008938088B2

(12) United States Patent
Tanaka et al.

(10) Patent No.: US 8,938,088 B2
(45) Date of Patent: Jan. 20, 2015

(54) METHOD AND APPARATUS FOR CLASSIFYING SECTIONS OF AN IMAGE INTO A PLURALITY OF EMBEDDED AREAS

(75) Inventors: Yoshiyasu Tanaka, Yokosuka (JP); Takaaki Yamada, Sagamihara (JP); Yuzo Oshida, Yokohama (JP)

(73) Assignee: Hitachi Solutions, Ltd., Tokyo (JP)

( * ) Notice: Subject to any disclaimer, the term of this patent is extended or adjusted under 35 U.S.C. 154(b) by 308 days.

(21) Appl. No.: 13/479,369

(22) Filed: May 24, 2012

(65) Prior Publication Data

US 2012/0300976 A1 Nov. 29, 2012

(30) Foreign Application Priority Data

May 25, 2011 (JP) ................. 2011-116695

(51) Int. Cl.
*G06K 9/00* (2006.01)
*H04N 1/32* (2006.01)
*H04N 21/8358* (2011.01)
*H04N 21/845* (2011.01)

(52) U.S. Cl.
CPC ....... *H04N 1/32165* (2013.01); *H04N 1/32197* (2013.01); *H04N 1/32203* (2013.01); *H04N 1/32208* (2013.01); *H04N 1/32229* (2013.01); *H04N 1/32251* (2013.01); *H04N 1/32299* (2013.01); *H04N 1/32304* (2013.01); *H04N 1/32309* (2013.01); *H04N 1/32315* (2013.01); *H04N 21/8358* (2013.01); *H04N 21/8456* (2013.01)
USPC .......................................................... 382/100

(58) Field of Classification Search
None
See application file for complete search history.

(56) References Cited

U.S. PATENT DOCUMENTS

| 2001/0012019 | A1* | 8/2001 | Yamazaki et al. | 345/639 |
|---|---|---|---|---|
| 2002/0122596 | A1* | 9/2002 | Bradshaw | 382/226 |
| 2004/0039914 | A1* | 2/2004 | Barr et al. | 713/176 |
| 2005/0262351 | A1* | 11/2005 | Levy | 713/176 |
| 2008/0130883 | A1* | 6/2008 | Agaian et al. | 380/54 |
| 2008/0149713 | A1* | 6/2008 | Brundage | 235/435 |
| 2008/0279460 | A1* | 11/2008 | Kasahara et al. | 382/224 |
| 2009/0046856 | A1* | 2/2009 | Mitchell | 380/243 |
| 2011/0228973 | A1* | 9/2011 | Agaian et al. | 382/100 |
| 2012/0300976 | A1* | 11/2012 | Tanaka et al. | 382/100 |
| 2012/0300982 | A1* | 11/2012 | Tanase et al. | 382/103 |
| 2013/0315438 | A1* | 11/2013 | Robert et al. | 382/100 |

FOREIGN PATENT DOCUMENTS

| JP | 2008-059534 A | 3/2008 |
|---|---|---|
| JP | 2009-278284 A | 11/2009 |
| JP | 2010-177742 A | 8/2010 |

(Continued)

OTHER PUBLICATIONS

Hersch et al., "Band Moire Images," Proc. SIGGRAPH 2004, ACM Trans. on Graphics, vol. 23, No. 3, pp. 239-248.

*Primary Examiner* — Tahmina Ansari
(74) *Attorney, Agent, or Firm* — Volpe and Koenig, P.C.

(57) ABSTRACT

An embodiment of this invention is an image processing device, including: a sectioning unit for sectioning an image into a plurality of sections to be processed; and a classification unit for classifying the plurality of sections to be processed into at least a clarification-processing-adapted area for embedding a latent image into the image, and an obfuscation-processing-adapted area for embedding a digital watermark into the image based on a characteristic of the image.

13 Claims, 15 Drawing Sheets

(56) References Cited

FOREIGN PATENT DOCUMENTS

| | | |
|---|---|---|
| JP | 2010-193405 A | 9/2010 |
| JP | 2011176385 | 9/2011 |
| WO | 2010/095321 A1 | 8/2010 |

* cited by examiner

Fig. 10

| INFORMATION TYPE (1001) | EXAMPLE OF INFORMATION FOR CLARIFICATION PROCESSING (1002) |
|---|---|
| IMAGE | /image/hideImage.jpg (1003) |
| SENTENCE | "DO NOT COPY", " GOTHIC", 36, (100, 100) (1004) |
| SCRIPT | PutString(100, 100, GetDate() + " for " + GetUserName(), " MING TYPE", 48pt) (1005) |
| ... | ... |

Fig. 11

| INFORMATION TYPE (1101) | EXAMPLE OF INFORMATION FOR OBFUSCATION PROCESSING (1102) |
|---|---|
| SENTENCE | Rent0001 (1103) |
| INTEGER | 0x123456789ABCDEF0 (1104) |
| SCRIPT | GetDate() << 32 + GetUserID() (1105) |
| ... | ... |

*Fig. 12*

| SECTION ID | SECTION TYPE | START POINT | END POINT |
|---|---|---|---|
| 1 | SPACE | (100, 100) | (200, 200) |
| 2 | SPACE | (200, 100) | (300, 200) |
| 3 | SPACE | (300, 100) | (400, 200) |
| ... | ... | ... | ... |

*Fig. 13*

| SECTION ID | SECTION TYPE | START POINT | END POINT |
|---|---|---|---|
| 1 | TIME | 0 | 0 |
| 2 | TIME | 30 | 0 |
| 3 | TIME | 60 | 0 |
| ... | ... | ... | ... |

*Fig. 14*

| SECTION ID (1201) | SECTION TYPE (1202) | START POINT (1203) | END POINT (1204) | |
|---|---|---|---|---|
| 1 | TIME/SPACE | 0-(100, 100) | (200, 200) | 1405 |
| 2 | TIME/SPACE | 0-(200, 100) | (300, 200) | 1406 |
| 3 | TIME/SPACE | 30-(100, 100) | (200, 200) | 1407 |
| ... | ... | ... | ... | |

*Fig. 15*

| SECTION ID (1201) | SECTION TYPE (1202) | START POINT (1203) | END POINT (1204) | CLASSIFICATION (1501) | |
|---|---|---|---|---|---|
| 1 | SPACE | (100, 100) | (200, 200) | CLARIFICATION-ADAPTED AREA | 1502 |
| 2 | SPACE | (200, 100) | (300, 200) | OBFUSCATION-ADAPTED AREA | 1503 |
| 3 | SPACE | (100, 200) | (200, 300) | OBFUSCATION-ADAPTED AREA | 1504 |
| ... | ... | ... | ... | ... | |

Fig. 16

| SECTION ID (1201) | SECTION TYPE (1202) | START POINT (1203) | END POINT (1204) | CLASSIFICATION (1501) | |
|---|---|---|---|---|---|
| 1 | TIME | 0 | 0 | CLARIFICATION-ADAPTED AREA | 1602 |
| 2 | TIME | 30 | 0 | OBFUSCATION-ADAPTED AREA | 1603 |
| 3 | TIME | 90 | 0 | CLARIFICATION-ADAPTED AREA | 1604 |
| ... | ... | ... | ... | ... | |

Fig. 17

| SECTION ID (1201) | SECTION TYPE (1202) | START POINT (1203) | END POINT (1204) | CLASSIFICATION (1501) | |
|---|---|---|---|---|---|
| 1 | TIME/SPACE | 0-(100, 100) | (200, 200) | CLARIFICATION-ADAPTED AREA | 1702 |
| 2 | TIME/SPACE | 0-(200, 100) | (300, 200) | OBFUSCATION-ADAPTED AREA | 1703 |
| 3 | TIME/SPACE | 30-(200, 100) | (300, 200) | CLARIFICATION-ADAPTED AREA | 1704 |
| ... | ... | ... | ... | ... | |

Fig. 20

| 1 | -1 | 1 | -1 | 1 |
|---|---|---|---|---|
| -1 | 1 | -1 | 1 | -1 |
| 1 | -1 | 1 | -1 | 1 |
| -1 | 1 | -1 | 1 | -1 |
| 1 | -1 | 1 | -1 | 1 |

METHOD AND APPARATUS FOR CLASSIFYING SECTIONS OF AN IMAGE INTO A PLURALITY OF EMBEDDED AREAS

CLAIM OF PRIORITY

The present application claims priority from Japanese patent application JP 2011-116695 filed on May 25, 2011, the content of which is hereby incorporated by reference into this application.

BACKGROUND OF THE INVENTION

This invention relates to a technology for classifying an image into a plurality of areas based on characteristics of the image.

There has been a problem of improper leakage of moving images to the outside of an organization. Particularly, improper leakage of moving images via video-sharing websites on the Internet has broad influence, and thus tends to be a problem. Improper video posting to video-sharing websites includes an intentional posting by a convinced criminal as well as a careless posting by a general person, both of which have been problems.

There has conventionally been known a method involving embedding an ID and the like identifying a distribution destination in a moving image by means of the digital watermark, and displaying this fact when distributing the moving image, thereby restraining the posting itself. US 2001/0012019 discloses a method involving embedding a visible digital watermark such as logo and an invisible digital watermark into an image.

SUMMARY OF THE INVENTION

However, in the method described in US 2001/0012019, an area is simply divided independently of a characteristic of the image to be subjected to embedding, and there is thus a problem that an unauthorized user can remove the invisible digital watermark.

This invention has been created in view of the above problem and an object of this invention is to provide a technique to classify sections of an image into a clarification-processing-adapted area for embedding a latent image into the image, and an obfuscation-processing-adapted area for embedding a digital watermark into the image based on a characteristic of the image.

An aspect of this invention is an image processing device, including: a sectioning unit for sectioning an image into a plurality of sections to be processed; and a classification unit for classifying the plurality of sections to be processed into at least a clarification-processing-adapted area for embedding a latent image into the image, and an obfuscation-processing-adapted area for embedding a digital watermark into the image based on a characteristic of the image.

An aspect of this invention allows classifying sections of an image into an area appropriate for clarification-processing and an area appropriate for obfuscation-processing.

BRIEF DESCRIPTION OF THE DRAWINGS

FIG. 10 is a table showing various examples of information for clarification processing according to the embodiment of this invention.

FIG. 11 is a table showing various examples of information for obfuscation processing according to the embodiment of this invention.

FIG. 12 is a table showing an example of section information in a case of sectioning by the sectioning processing in space direction.

FIG. 13 is a table showing an example of section information in a case of sectioning by the sectioning processing in time direction.

FIG. 14 is a table showing an example of section information in a case of sectioning by the sectioning processing in time/space direction.

FIG. 15 is a table showing an example of divided data in the case of the sectioning processing in space direction as the image sectioning processing.

FIG. 16 is a table showing an example of divided data in the case of the sectioning processing in time direction as the image sectioning processing.

FIG. 17 is a table showing an example of divided data in the case of the sectioning processing in time/space direction as the image sectioning processing.

FIG. 20 is a diagram illustrating an example of a template in a 5×5 matrix.

DETAILED DESCRIPTION OF THE PREFERRED EMBODIMENT

Figure 1:
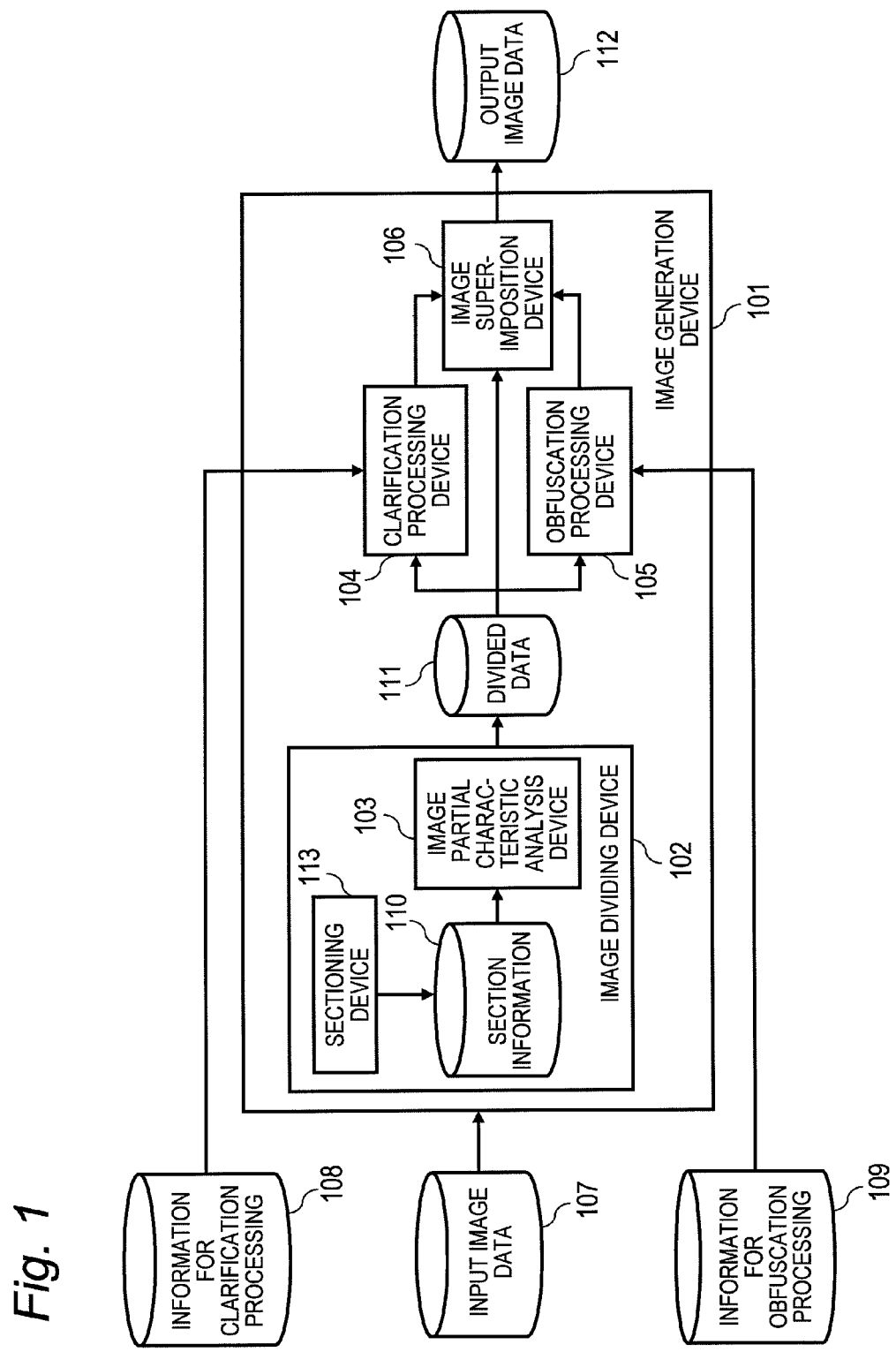
FIG. 1 is a diagram illustrating a system configuration of an image generation device according to an embodiment of this invention.

A description is now given of an embodiment of this invention referring to the drawings.

FIG. 1 is a diagram illustrating a system configuration of an image generation device 101 according to the embodiment of this invention. The image generation device 101 includes an image dividing device (also referred to as image processing device) 102, a clarification processing device 104, an obfuscation processing device 105, and an image superimposition device (also referred to as latent image embedding unit and a digital watermark embedding unit) 106. The image generation device 101 receives, as inputs, input image data 107, information for clarification processing 108, and information for obfuscation processing 109, and outputs output image data 112.

The image dividing device 102 includes a sectioning device (also referred to as sectioning unit) 113 and an image partial characteristic analysis device (also referred to as classification unit) 103. The image dividing device 102 receives the input image data 107 as an input, generates section information 110, and outputs divided data 111.

The image generation device 101, the image dividing device 102, the image partial characteristic analysis device 103, the clarification processing device 104, the obfuscation processing device 105, the image superimposition device 106, and the sectioning device 113 may be realized respectively as dedicated devices, or may be realized by general personal computers (PCs) and dedicated software programs. According to this embodiment, an example in which the devices are realized by general PCs and dedicated software programs is exemplified.

Figure 2:
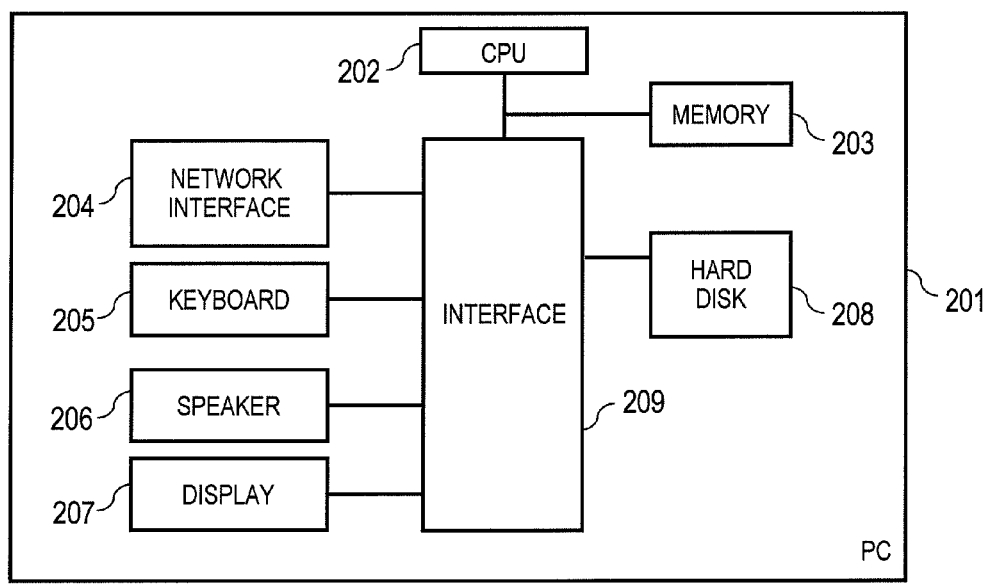
FIG. 2 is a diagram illustrating an example of an internal configuration of a general PC.

FIG. 2 is a diagram illustrating an example of an internal configuration of the general PC. The PC 201 includes a CPU 202, a memory 203, a network interface 204, a keyboard 205, a speaker 206, a display 207, a hard disk 208, and an interface 209.

The CPU 202 is a central processing unit, and executes a program stored in the memory 203 or a program read out from the hard disk 208 into the memory 203.

It should be noted that as necessary, the program may be introduced by a storage medium which is readable by the PC 201, and detachable from the PC 201. In this case, a device for reading the storage medium is connected to the interface 209, and is then used. As the storage medium and the device for reading the storage medium, an optical disc (such as CD, DVD, and Blu-ray disc) and a flash memory and a device for using the optical disc and the flash memory are generally known, and such memory and device may be used. Moreover, as necessary, the program may be introduced into the PC via a communication medium (such as a communication line and a carrier wave on the communication line) by the network interface 204.

The memory 203 is a device for temporarily storing programs executed by the CPU 202 and data.

The network interface 204 is a device for communicating to/from a device outside the PC 201, such as another PC.

The keyboard 205 is a device operated by an operator of the PC 201 for inputting commands and data to the PC 201.

The speaker 206 is a device for reproducing a signal as sound.

The display 207 is a device for displaying a processing result and the like.

The hard disk 208 is a device for storing programs and data, and may include a magnetic disk, a non-volatile memory, or the like, for example. In this case, the programs and data stored in the hard disk 208 are normally maintained when the hard disk 208 is turned off, and then is turned on. It should be noted that an operating system (OS) is introduced into the hard disk 208 in advance. This configuration enables specification of the program through use of a file name, for example. On this occasion, the OS is a basic software program for a computer, and a widely known OS may be used.

The interface 209 is used for connection to the devices in the PC 201, and is connected to the respective devices in the PC 201.

As described above, in this specification, the example of realizing the image generation device 101, the image dividing device 102, the image partial characteristic analysis device 103, the clarification processing device 104, the obfuscation processing device 105, the image superposition device 106, and the sectioning device 113 (hereinafter, referred to as respective devices) by the PC 201 and the dedicated software programs is exemplified. Herein, the dedicated software program refers to a program for controlling the CPU 202 to carry out processing (described later) to be carried out by the respective devices.

Moreover, this specification exemplifies an example of realizing the respective devices by a single PC 201. Data are freely shared among the respective devices through use of a shared area on the memory 203 or the hard disk 208. In a case where the respective devices are realized by the single PC 201, the dedicated software programs are not necessarily provided individually, and the respective devices may be realized by subroutines (such as functions) in the signal software program as necessary.

It should be noted that the respective devices may be realized by independent PCs 201. In this case, communication of data between the respective devices may be carried out via the network interface 204.

A description is now given of processing carried out by the image dividing device 102 according to this embodiment.

Figure 3:
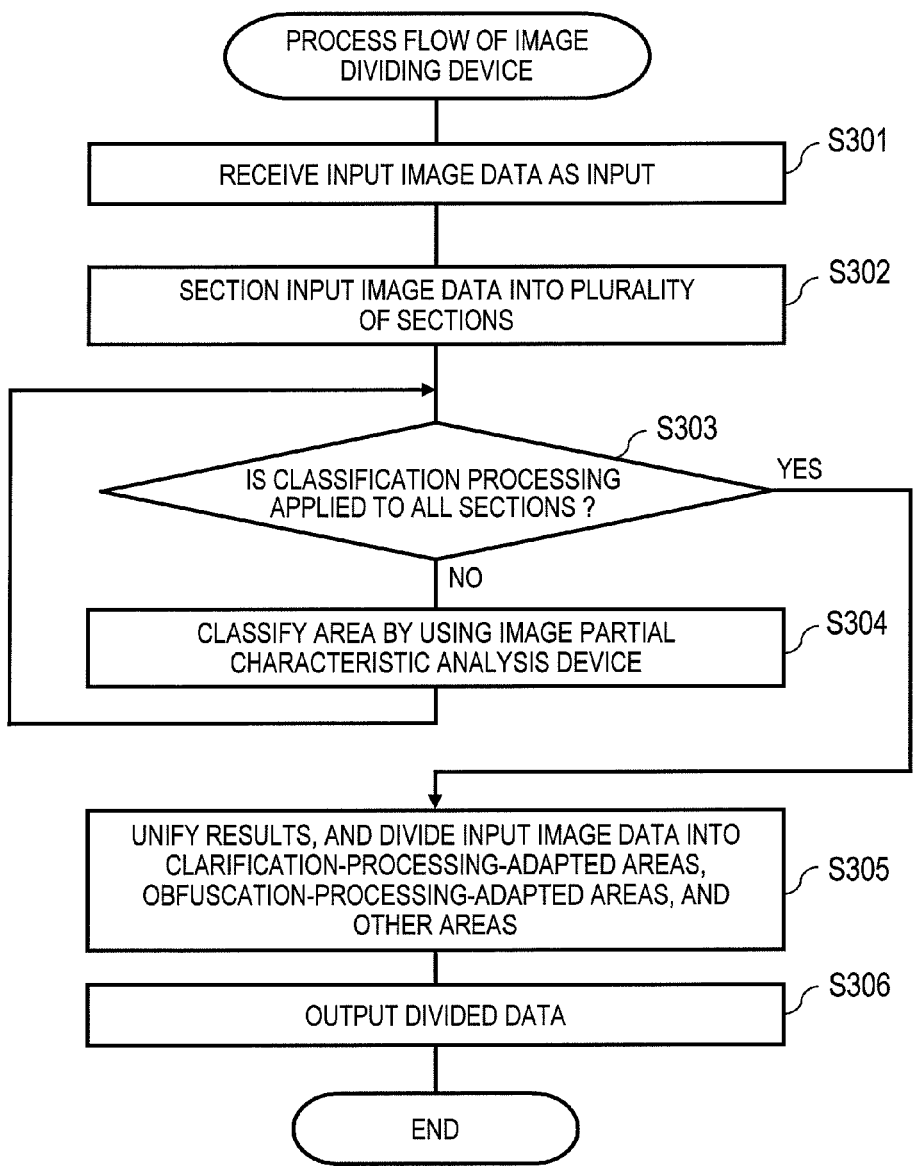
FIG. 3 is a flowchart illustrating a process flow carried out in an image dividing device.

FIG. 3 is a flowchart illustrating a process flow carried out in the image dividing device 102.

In Step S301, the image dividing device 102 receives the input image data 107 as an input. Still image data such as those in JPEG, PNG, PDF, and TIFF formats and the like, and moving image data as those in AVI and MPEG (such as MPEG-2 PS and MPEG-2 TS) formats and the like can be the input image data 107.

In Step S302, the image dividing device 102 divides the input image data 107 into a plurality of sections by using the sectioning device 113. A description is given of specific examples of this processing referring to FIGS. 4 to 6 and other figures. As a result of the processing, the section information 110, which is information relating to the sections, is generated in the memory 203 or the hard disk 208 of the image dividing device 102. It should be noted that this step is described in detail later.

In Step S303, the image dividing device 102 determines whether or not classification processing described later has been applied to all the sections divided in Step S302. When the determination is negative in Step S303, the image dividing device 102 takes out a section to which the classification processing is not applied from the plurality of sections divided in Step S302, and proceeds to Step S304.

In Step S304, the image dividing device 102 classifies the sections to be processed into a clarification-processing-adapted area and an obfuscation-processing-adapted area, and other area as necessary, by using the image partial characteristic analysis device 103. This step is described in detail later.

On the other hand, when the determination in Step S303 is affirmative, the image dividing device 102 proceeds to Step S305. In Step S305, the image dividing device 102 unifies the classified results in Step S304, thereby dividing the input image data 107 into the clarification-processing-adapted areas, the obfuscation-processing-adapted areas, and other areas.

In Step S306, the image dividing device 102 outputs the divided data 111 which is a result of the division in Step S305. The divided data 111 is described later referring FIG. 15 and the like.

A description is now given of the image sectioning processing carried out by the sectioning device 113, namely a specific example of the processing in Step S302 of FIG. 3. As a first specific example of the image sectioning processing, a description is given of sectioning processing in space direction. The sectioning processing in space direction is processing of sectioning a still image into a plurality of sections without overlaps.

Figure 18:
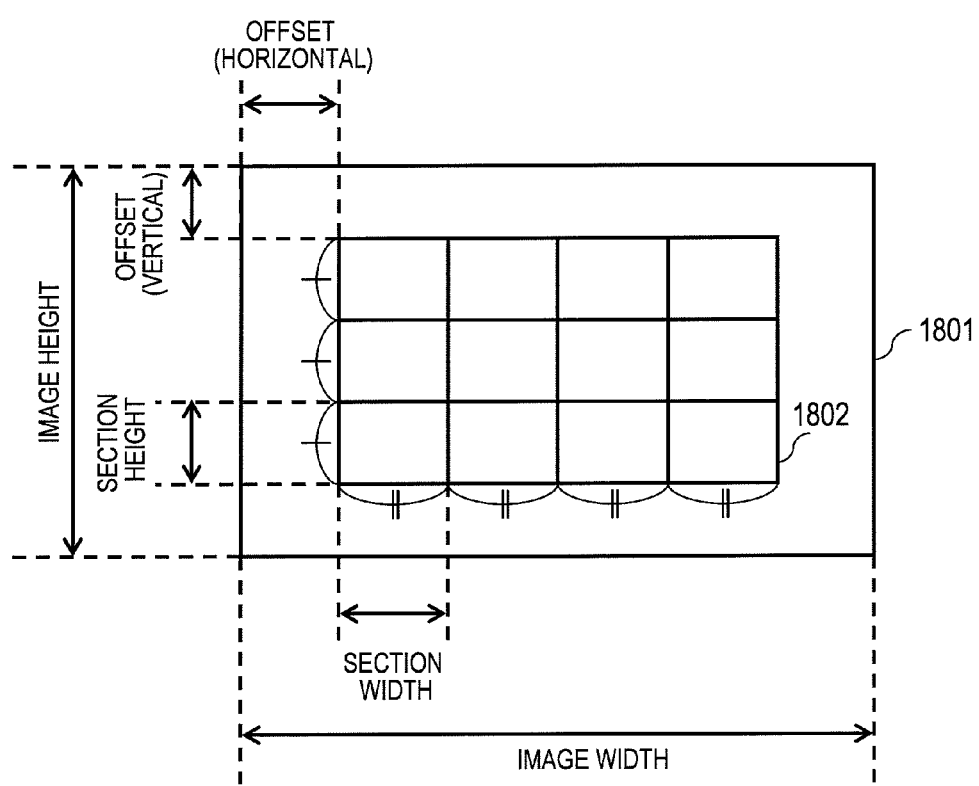
FIG. 18 is a diagram illustrating an example of an image sectioned by the sectioning processing in space direction.

FIG. 18 is a diagram illustrating an example of an image sectioned through the sectioning processing in space direction. An image 1801 is divided into a plurality of sections 1802. In the example illustrated in FIG. 18, the image 1801 is divided into twelve sections arranged in four columns in the horizontal direction, and three rows in the vertical direction, and all the sections have a common section width and section height.

Arbitrary section width and section height may be specified, but the respective sections are classified into the clarification-processing-adapted area, the obfuscation-processing-adapted-area, and other area, and hence it is preferred that an area to which the clarification processing is adapted and an area to which the obfuscation processing is adapted do not coexist in the same section. Therefore, it is preferred that the section width and the section height be set to approximately 1 to 10% of the image width and the image height, respectively, for example.

In the image 1801 illustrated in FIG. 18, there is an area which is not sectioned around the plurality of sections 1802. In other words, a union of all the sections does not always need to constitute the whole image.

Figure 4:
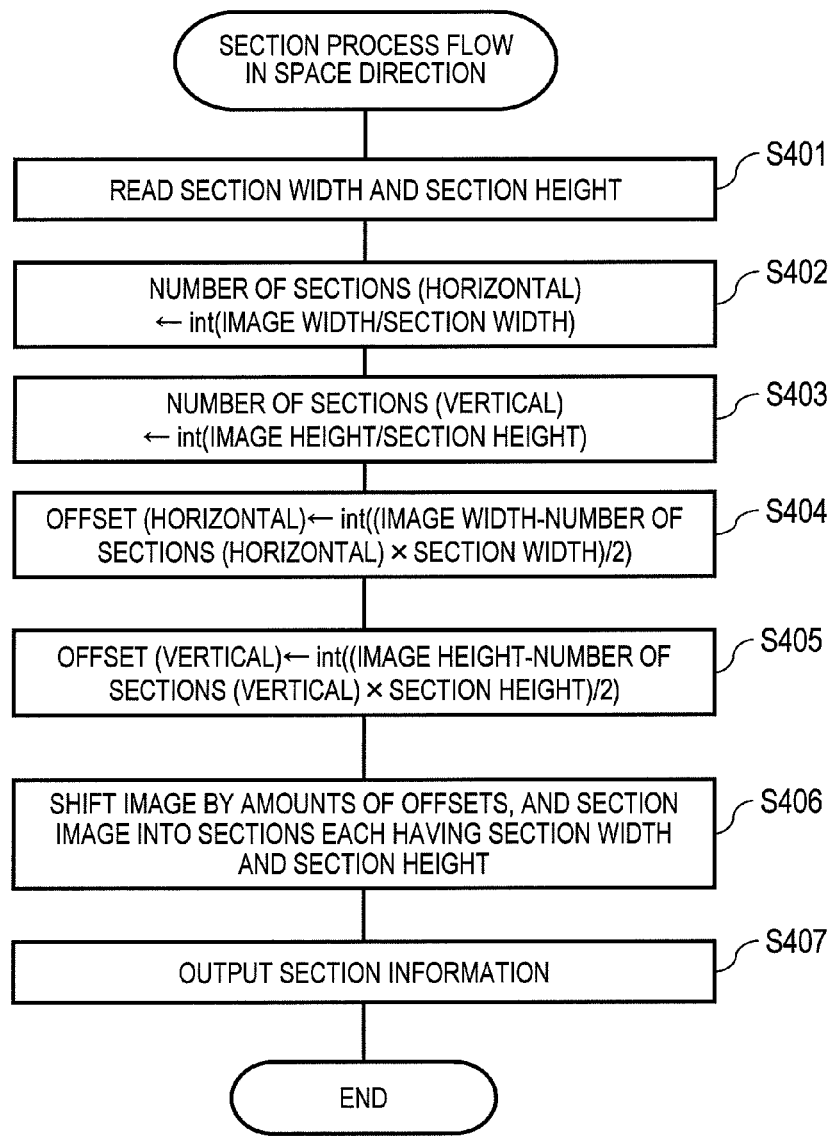
FIG. 4 is a flowchart illustrating an overview of sectioning processing in space direction, which is an example of image sectioning processing carried out by the image dividing device.

FIG. 4 is a flowchart illustrating an overview of the sectioning processing in space direction, which is an example of the image sectioning processing carried out by the sectioning device 113.

In Step S401, the sectioning device 113 reads the section width and the section height. The section width and the section height may be specified in unit of pixel of the image, in unit of an actual size of the image, or the like. If the section width and the section height are specified in unit of the actual size, information on the resolution contained in the input image data is used. For example, if the type of the image data is TIFF, the image data may have resolution information as tags, such as ResolutionUnit, XResolution, and YResolution. As the unit, centimeter or inch is usually used, but those units can be properly converted by the CPU 202 by using the relationship of 1 inch=2.54 centimeters. For example, if two centimeters are specified as the section width, and 300 DPI (300 pixels per inch) are specified as XResolution of the input image, the sectioning device 113 can calculate the section width in unit of pixel as 300×(2/2.54)=236 pixels (rounded off to the closest whole number). It should be noted that the sectioning device 113 can also calculate the section height in unit of pixel by using YResolution in a similar manner. The following description is given assuming that the section width and the section height are represented in unit of pixel.

The section width and the section height may be stored in the hard disk 208 within the section device 113 in advance by installation personnel when the sectioning device 113 is installed, or when the input image data 107 is input, the section width and the section height may also be read together with the input image data 107 by the image generation device 101 into the hard disk 208 within the image generation device 101, and may be respectively referred to. Moreover, the section width and the section height may be input from the keyboard 205 of the sectioning device 113 or the like.

In Step S402, the sectioning device 113 acquires int(image width/section width) and sets int(image width/section width) to the number of sections (horizontal). The number of sections (horizontal) is the number of sections in the horizontal direction of the image. Moreover, int(x) is a function for truncating x after the decimal point. This calculation is carried out per pixel.

In Step S403, the sectioning device 113 acquires int(image height/section height) and sets int(image height/section height) to the number of sections (vertical). The number of sections (vertical) is the number of sections in the vertical direction of the image. Also in this step, the calculation is carried out per pixel as in Step S402.

In Step S404, the sectioning device 113 acquires int((image width-number of sections (horizontal)×(section width)/2) and sets int((image width-number of sections (horizontal)×(section width)/2) to the offset (horizontal). The offset (horizontal) is an offset amount in the horizontal direction of an image, which is to be used for offset processing carried out in Step S406 described later.

In Step S405, the sectioning device 113 acquires int((image width-number of sections (vertical)×(section height)/2) and sets int((image width-number of sections (vertical)×(section height)/2) to the offset (vertical). The offset (vertical) is an offset amount in the vertical direction of the image, which is to be used for the offset processing carried out in Step S406 described later.

In Step S406, the sectioning device 113 shifts the image by the amounts of the offsets, and sections the image into sections each having the section width and the section height. The shift of the image by the amounts of offsets means that the sectioning processing starts from coordinates (offset (horizontal),offset(vertical)) assuming that the upper left corner of the image data is the origin, the x axis extends rightward and the y axis extends downward, and the coordinates are set per pixel, as illustrated in FIG. 18.

Moreover, the image is sectioned into the sections through sectioning the image from the processing start point rightward a number of times corresponding to the number of sections (horizontal) every section width and downward a number of times corresponding to the number of sections (vertical) every section height. Each of the sections after the sectioning constitutes a section.

In Step S407, the sectioning device 113 outputs the section information 110. The section information 110 includes a section ID 1201, a section type 1202, a start point 1203, an end point 1204, and the like.

In the flowchart illustrated in FIG. 4, it is necessary to carry out the processing in Step S402 and the processing in Step S404 in the stated order. It is also necessary to carry out the processing in Step S403 and the processing in Step S405 in the stated order. However, the order of the processing in Step S402 and the processing in Step S403 may be reversed. In other words, Step S403 may be executed before Step S402, for example.

FIG. 12 is a table showing an example of the section information 110 in a case of sectioning by the sectioning processing in space direction. In FIG. 12, information on one section is described in one row. The section information 110 is a combination of information on single or a plurality of sections.

Item names are described in the first row of FIG. 12. The item names are as follows. Specifically, a section ID 1201 is a section ID, a section type 1202 is section type information, and a start point 1203 is start point information, and an end point 1204 is end point information.

In FIG. 12, information on respective sections is described in the second and the following rows. For example, information on a section having the section ID 1201 of "1" is described in a row 1205. The section type 1202 of the section having the section ID 1201 of "1" is the space. In other words, the row 1205 represents that the section having the section ID 1201 of "1" is a section in space direction.

In information on a section having the section type 1202 of "SPACE", the start point 1203 is coordinates in an image to constitute a start point of the section, and the end point 1204 is coordinates obtained by adding +1 both to the x coordinate and the y coordinate of coordinates in the image to constitute an end point of the section. A rectangular area in which the start point and the end point constitute diagonal vertices forms a section. For example, for the section having the section ID 1201 of "1" described in the row 1205 of FIG. 12, the start point 1203 is (100, 100), and the end point 1204 is (200, 200). In other words, a rectangular area (including borders) having the coordinates (100, 100), coordinates (199, 100), coordinates (199, 199) and coordinates (100, 199) as vertices forms a section.

A description is now given of the image sectioning processing carried out by the sectioning device 113, namely, sectioning processing in time direction as a second specific example of the processing in Step S302 of FIG. 3. The sectioning processing in time direction is processing of sectioning a moving image into frames.

Figure 5:
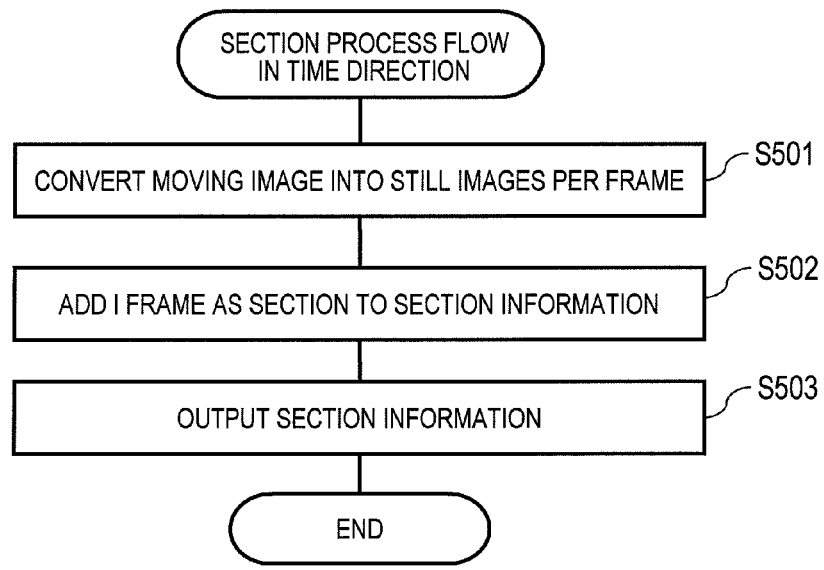
FIG. 5 is a flowchart illustrating an overview of sectioning processing in time direction, which is an example of the image sectioning processing carried out by the image dividing device.

FIG. 5 is a flowchart illustrating an overview of the sectioning processing in time direction, which is an example of the image sectioning processing carried out by the sectioning device 113.

In Step S501, the sectioning device 113 converts the moving image into still images per frame. The moving image can generally be handled as a set of a plurality of still images (typically 30 or 24 still images per second). The conversion from a moving image to a set of sill images can be realized by a generally available function of an OS, a function provided by a generally available video extension library, or the like.

In Step S502, the sectioning device 113 adds an I frame out of the plurality of still images acquired by the conversion processing in Step S501 as the section to the section information. Herein, the I frame refers to a frame which can constitute an image without referring to another frame. In general, the moving image is large in data amount, and hence there is a strong need for the data amount compression. Information on the current image is generally represented by utilizing the fact that the moving image has a high correlation in the time axis direction, and thus by utilizing information on images in other frames (namely, other times).

The I frame does not refer to another frame, and it is considered in general that the I frame is high in image quality. Thus, the I frame is to be processed in Step S502.

In Step S503, the sectioning device 113 outputs the section information 110.

FIG. 13 is a table showing an example of the section information 110 in a case of sectioning by the sectioning processing in time direction. Item names are described in the first row of FIG. 13. The item names are the same as those of FIG. 12. For example, information on a section having the section ID 1201 of "2" is described in a row 1306. On this row, there is a description that the section type 1202 is "TIME". In other words, the section having the section ID 1201 of "2" is a section in time direction.

Moreover, in the information on the section having the section type 1202 of "TIME", the start point 1203 is the frame number to be the start point of the section. The information on the end point 1204 is not used, and hence 0 is usually described. It should be noted that the frame number for the first frame is 0, and the frame number increases one by one subsequently following a frame sequence. For example, for a section described on the row 1306, "30" is described as the start point 1203. In other words, a 30th frame is used as the section.

A description is given above of the sectioning processing in time direction, but the processing of this embodiment may be carried out per group of pictures (GOP). The GOP is a set of still images in a moving image. Generally, a GOP contains at least one I frame, which constitutes a unit of rewinding or the like. A turnaround time may be reduced by carrying out the processing from Steps S501 to S503 per GOP.

Moreover, the I frame is to be processed in the above description, but this is a typical example, and the P frame or the B frame may be to be processed. The P frame is a frame referring to the previous frame, and the B frame is a frame referring to previous and following frames. It should be noted that a frame referring to the following frame may be to be processed. The fact that a frame other than the I frame may be used also holds true for the following description.

Moreover, the sectioning is carried out every certain period (every certain number of frames) in the above-mentioned example, but the sectioning may be carried out at a scene change or a position where an image largely changes. The scene change can be determined by preparing a certain threshold, extracting an I frame, checking whether or not an absolute value of a difference between this I frame and a previous I frame (sum of absolute values of differences in each of pixels) is larger than the threshold, and determining a scene change when the absolute value is larger than the threshold. Moreover, it is possible to employ another general scene change determination mechanism.

A description is now given of the image sectioning processing carried out by the sectioning device 113, namely, sectioning processing in time/space direction as a third specific example of the processing in Step S302 of FIG. 3. The sectioning processing in time/space direction is processing of sectioning a moving image into frames, extracting an I frame, and further sectioning the I frame in the space direction.

Figure 6:
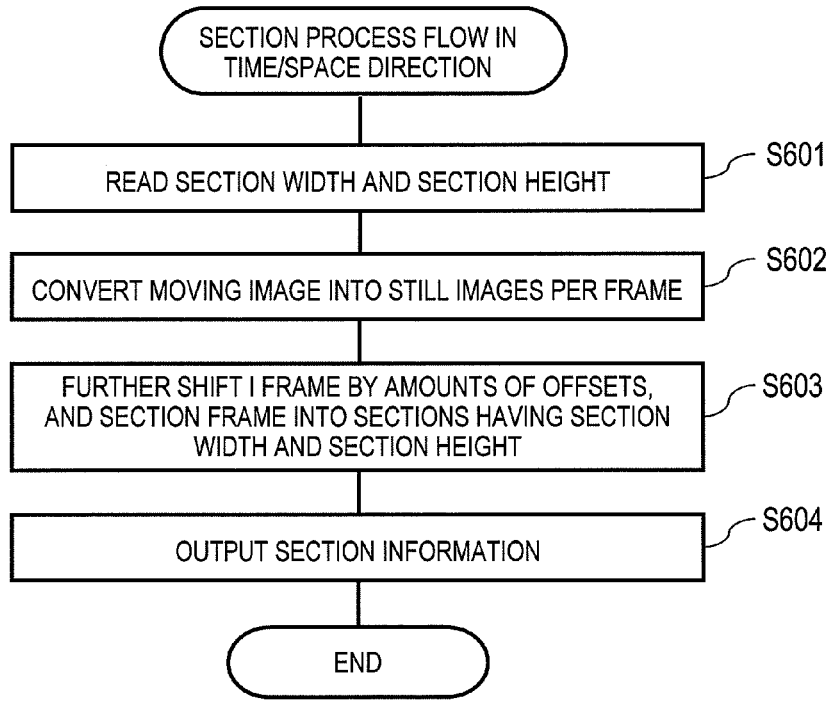
FIG. 6 is a flowchart illustrating an overview of sectioning processing in time/space direction, which is an example of the image sectioning processing carried out by the image dividing device.

FIG. 6 is a flowchart illustrating an overview of the sectioning processing in time/space direction, which is an example of the image sectioning processing carried out by the sectioning device 113.

In Step S601, the sectioning device 113 reads the section width and the section height. This processing is the same as the processing in Step S401 of the flowchart illustrated in FIG. 4, and a detailed description thereof is therefore omitted.

In Step S602, the sectioning device 113 converts the moving image into still images per frame. This processing is the same as the processing in Step S501 of the flowchart illustrated in FIG. 5, and a detailed description thereof is therefore omitted.

In Step S603, the sectioning device 113 extracts an I frame out of the plurality of still images acquired by the conversion processing in Step S602, and shifts the extracted I frame by the amounts of the offsets, and sections the I frame into sections having the section width and the section height. This processing is realized by applying the processing from Step S402 to Step S406 of the flowchart illustrated in FIG. 4 to the I frame.

In Step S604, the sectioning device 113 outputs the section information 110.

FIG. 14 is a table showing an example of the section information 110 in a case of sectioning by the sectioning processing in time/space direction. Item names are described in the first row of FIG. 14. The item names are the same as those of FIG. 12. For example, information on a section having the section ID 1201 of "3" is described in a row 1407. On this row, there is a description that the section type 1202 is "TIME/

SPACE". In other words, the section having the section ID 1201 of "3" is a section in time/space direction.

In information on a section having the section type 1202 of "SPACE/FRAME", the start point 1203 describes a frame number n to be a start point of the section, and coordinates p in the frame image in a form of n-p, and the end point 1204 describes coordinates obtained by adding +1 both to the x coordinate and the y coordinate of coordinates in an n-th frame image to be an end point of the section. A rectangular area in which the start point and the end point constitute diagonal vertices forms a section. For example, in the row 1407, 30–(100, 100) is described as the start point 1203, and (200, 200) is described as the end point 1204. In other words, a rectangular area (including borders) having the coordinates (100, 100), coordinates (199, 100), coordinates (199, 199), and coordinates (100, 199) as vertices in the 30th frame forms a section.

A description is given of the sectioning processing in time/space direction, but the processing of this embodiment may be carried out per GOP, as in the sectioning processing in time direction. A turnaround time may be reduced by carrying out the processing from Steps S602 to S604 per GOP.

A description is now given of a specific example of the image partial characteristic analysis processing carried out by the image partial characteristic analysis device 103, namely a specific example of the processing in Step S304 of FIG. 3. First, as an example of the image partial characteristic analysis processing, a description is now given of frequency analysis processing.

Figure 7:
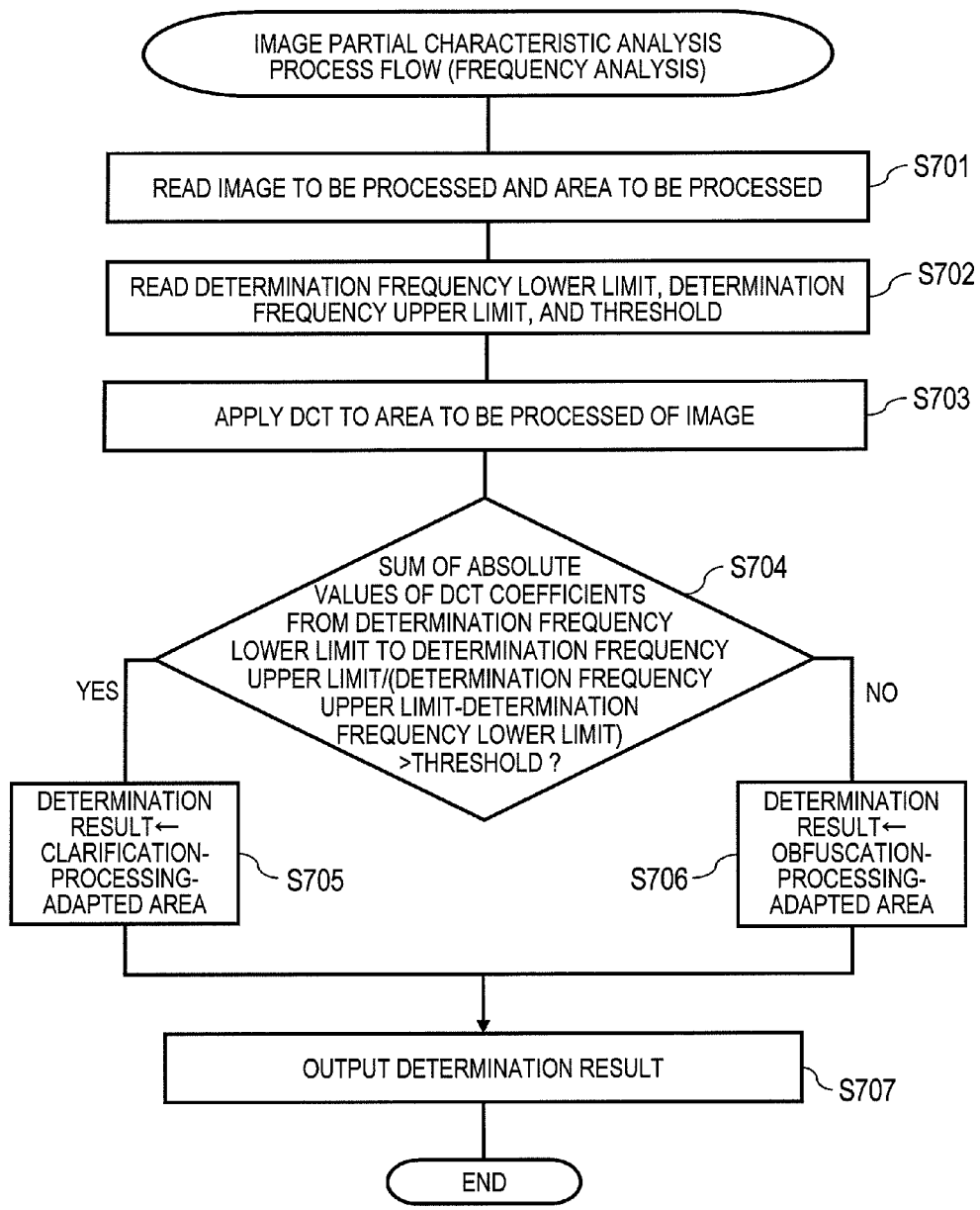
FIG. 7 is a flowchart illustrating an overview of frequency analysis processing as image partial characteristic analysis processing carried out in an image partial characteristic analysis device.

FIG. 7 is a flowchart illustrating an overview of the frequency analysis processing as the image partial characteristic analysis processing carried out by the image partial characteristic analysis device 103.

In Step S701, the image partial characteristic analysis device 103 reads an area to be processed of an image to be processed. The image to be processed and the area to be processed are specified by the image dividing device 102. In other words, in Step S303 of FIG. 3, the image dividing device 102 has extracted a section to be processed, and the extracted section constitutes the area to be processed.

Moreover, the image to be processed is the input image 107 received by the image dividing device 102 as the input in Step S301 of FIG. 3. The input image data 107 is passed and received by using the memory 203 or the hard disk 208 shared by the image dividing device 102, the image partial characteristic analysis device 103, and the sectioning device 113.

In Step S702, the image partial characteristic analysis device 103 reads a determination frequency lower limit, a determination frequency upper limit, and a threshold into the memory 203 of the image partial characteristic analysis device 103. It should be noted that those values are used for processing in Step S704 described later, and are stored by installation personnel or the like in the hard disk 208 of the image partial characteristic analysis device 103 as initial setting when the image partial characteristic analysis device 103 is installed.

In Step S703, the image partial characteristic analysis device 103 applies the discrete cosine transform (DCT) to the area to be processed of the image. The DCT is a well-known technology, and is described in K. R. Rao, P. Yip, "Discrete Cosine Transform Algorithms, Advantages, Applications," Academic Press, Inc.

In Step S704, the image partial characteristic analysis device 103 determines whether or not (sum of absolute values of DCT coefficients from determination frequency lower limit to determination frequency upper limit/(determination frequency upper limit-determination frequency lower limit)) is larger than a threshold. When the determination in Step S704 is affirmative, the image partial characteristic analysis device 103 proceeds to Step S705, and when the determination is negative, the image partial characteristic analysis device 103 proceeds to Step S706. It should be noted that the determination is affirmative in Step S704 when there are many low frequency components in the area to be processed of the image, and the determination is negative in Step S704 when there are many high frequency components in the area to be processed of the image.

In Step S705, the image partial characteristic analysis device 103 sets a clarification-processing-adapted-area as the determination result.

In Step S706, on the other hand, the image partial characteristic analysis device 103 sets an obfuscation-processing-adapted area as the determination result.

In Step S707, the image partial characteristic analysis device 103 outputs the determination result.

It should be noted that, in the above-mentioned processing, two of an upper threshold and a lower threshold as the thresholds may be prepared, and in Step S704, when (sum of absolute values of DCT coefficients from determination frequency lower limit to determination frequency upper limit/(determination frequency upper limit-determination frequency lower limit)) is larger than the upper threshold, the image partial characteristic analysis device 103 may proceed to Step S705, when the value is smaller than the lower threshold, the image partial characteristic analysis device 103 may proceed to Step S706, and otherwise, the image partial characteristic analysis device 103 may set "other area" as the determination result.

Figure 20:
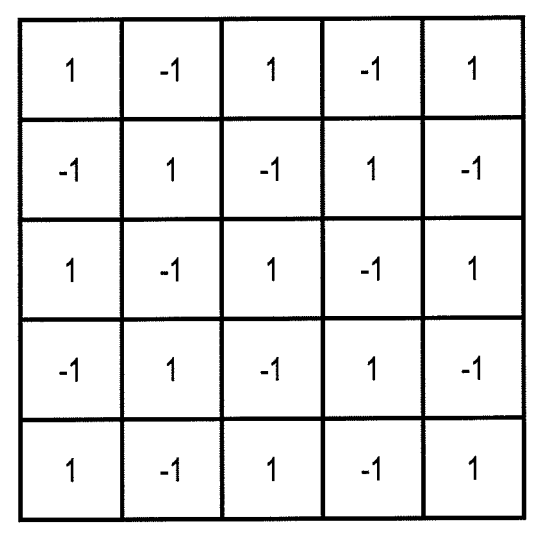

A description is now given of template analysis processing as another example of the image partial characteristic analysis processing carried out by the image partial characteristic analysis device 103. Herein, the template refers to a 3×3 matrix, for example, and is used to extract a characteristic of an image through convolution with the image. The template is also called a filter, and typically approximately a 3×3 to 7×7 matrix. FIG. 20 is a diagram illustrating an example of the template in a 5×5 matrix. It should be noted that the template may not be a square matrix.

Figure 8:
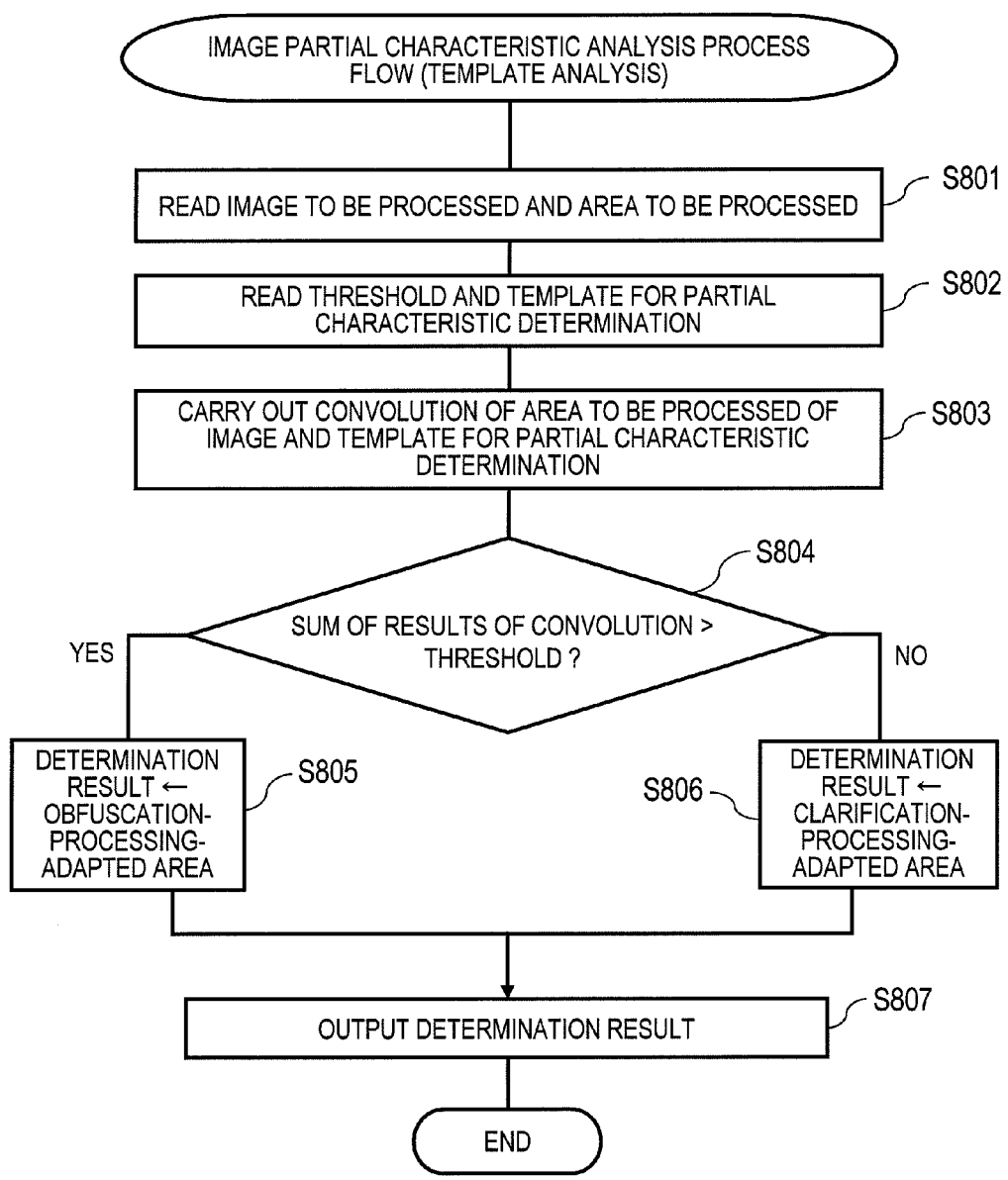
FIG. 8 is a flowchart illustrating an overview of template analysis processing as the image partial characteristic analysis processing carried out in the image partial characteristic analysis device.

FIG. 8 is a flowchart illustrating an overview of the template analysis processing as the image partial characteristic analysis processing carried out by the image partial characteristic analysis device 103.

In Step S801, the image partial characteristic analysis device 103 reads an area to be processed of an image to be processed. This processing is the same as the processing in Step S701 of the flowchart illustrated in FIG. 7, and a detailed description thereof is therefore omitted.

In Step S802, the image partial characteristic analysis device 103 reads a threshold and a template for partial characteristic determination. It should be noted that the threshold and the template for partial characteristic determination are used for processing in Step S803 described later, and are stored by installation personnel or the like in the hard disk 208 of the image partial characteristic analysis device 103 as initial setting when the image partial characteristic analysis device 103 is installed.

In Step S803, the image partial characteristic analysis device 103 carries out two-dimensional convolution of the area to be processed of the image and the template for partial characteristic determination. The two-dimensional convolution is defined by the following equation (1), where 2w+1 is a width of the template for partial characteristic determination, 2h+1 is a height thereof, templ(u,v) is a value of the template for partial characteristic determination at coordinates (u,v), and Img(x,y) is a pixel value at coordinates (x,y) in the area to be processed of the image. In the equation (1), c(x,y) represents a result of the two-dimensional convolution, and has the same size as that of the area to be processed of the image. In other words, the domain of c(x,y) is also represented as 0≤x<IW and 0≤y<IH, where IW represents the width of the area to be processed of the image, and IH represents the height thereof.

[Math. 1]

$$c(x, y) = \sum_{u=-w}^{w} \sum_{v=-h}^{h} Tmpl(u, v) Img(x - u, y - v) \quad (1)$$

It should be noted that coordinates where the upper left corner of the area to be processed of the image is the origin are used in the equation (1). Moreover, it is assumed that the width and the height of the template are odd numbers in the above description, but the width and the height may be even numbers. In this case, the width and the height are set to 2w and 2h, respectively. Further, values such as Tmpl(−1,0) and Img(0,−1), which are out of the domain, are set to 0.

In Step S804, the image partial characteristic analysis device 103 determines whether or not a sum of the results of the convolution exceeds a threshold. Herein, the sum of the results of the convolution refers to a sum of absolute values of the results of the two-dimensional convolution, and is defined by the following equation (2). In the equation (2), |x| represents an absolute value of x, and S represents the sum of the results of the two dimensional convolution.

[Math. 2]

$$S = \sum_{x=0}^{IW-2} \sum_{y=0}^{IH-1} |c(x, y)| \quad (2)$$

When the determination in Step S804 is affirmative, the image partial characteristic analysis device 103 proceeds to Step S805, and when the determination is negative, the image partial characteristic analysis device 103 proceeds to Step S806. It should be noted that the template illustrated in FIG. 20 is assumed as the template for the partial characteristic determination. Therefore, the determination is affirmative in Step S804 when there are many low frequency components in the area to be processed of the image, and the determination is negative when there are many high frequency components in the area to be processed of the image.

In Step S805, the image partial characteristic analysis device 103 sets an obfuscation-processing-adapted area as the determination result.

In Step S806, on the other hand, the image partial characteristic analysis device 103 sets a clarification-processing-adapted area as the determination result.

In Step S807, the image partial characteristic analysis device 103 outputs the determination result.

It should be noted that, in the above-mentioned processing, two of an upper threshold and a lower threshold as the thresholds may be prepared, and in Step S804, when the sum of the results of the convolution is larger than the upper threshold, the image partial characteristic analysis device 103 may proceed to Step S805, when the sum of the results of the convolution is smaller than the lower threshold, the image partial characteristic analysis device 103 may proceed to Step S806, and otherwise, the image partial characteristic analysis device 103 may set "other area" as the determination result.

For example, 1 and −1 are arranged in a checkerboard pattern in the template illustrated in FIG. 20. It is considered that a location at which the sum of the convolution results with this template is large is a location at which the ups and downs of the image are large, and this location is adapted to the obfuscation processing described later.

It should be noted that, in the above-mentioned processing, a template which can be used for searching for a location at which the ups and downs of an image (such as a 5×5 matrix, all the elements of which is ½₅, for example) are small may be prepared as a template, for example, an area in which a sum of convolution results is larger than a threshold may be set to a clarification-processing-adapted area, and an area in which the sum is not larger than the threshold may be set to an obfuscation-processing-adapted area.

A description is now given of the divided data 111. The divided data 111 is data representing a result of dividing the input image 107 into the clarification-processing-adapted area, the obfuscation-processing-adapted area, and the other area based on the section information 110.

Examples of the divided data 111 are illustrated in FIGS. 15, 16, and 17. FIG. 15 is a table showing an example of the divided data in the case of the sectioning processing in space direction as the image sectioning processing. FIG. 16 is a table showing an example of the divided data in the case of the sectioning processing in time direction as the image sectioning processing. FIG. 17 is a table showing an example of the divided data in the case of the sectioning processing in space/time direction as the image sectioning processing. In FIGS. 15 to 17, divided data in one section is described in one row. The divided data 111 is a combination of divided data relating to single or a plurality of sections.

In FIGS. 15 to 17, item names are described on the first row as in FIG. 12. The item names are as follows. Specifically, a section ID 1201 is a section ID, a section type 1202 is section type information, and a start point 1203 is start point information, and an end point 1204 is end point information. Those definitions are the same as those in FIGS. 12, 13, and 14. The divided data further contains a classification 1501 representing whether this section is the clarification-adapted area or the obfuscation-adapted area. The item of the classification 1501 may further contain a content "OTHER AREA."

In FIGS. 15 to 17, divided data for each section is described starting from the second row. For example, information on a section having the section ID 1201 of "1" is described in FIG. 15. The section type 1202 of the section having the section ID 1201 of "1" is space, the start point 1203 thereof is (100, 100), the end point 1204 thereof is (200, 200), and the classification 1501 thereof is the clarification-adapted area. In other words, it is represented that the section in a rectangular area (including borders) having the coordinates (100, 100), coordinates (199, 100), coordinates (199, 199) and coordinates (100, 199) as vertices is a clarification-processing-adapted area. This holds true for FIGS. 16 and 17, and a detailed description thereof is thus omitted.

A description is now given of the processing carried out by the image generation device 101.

Figure 9:
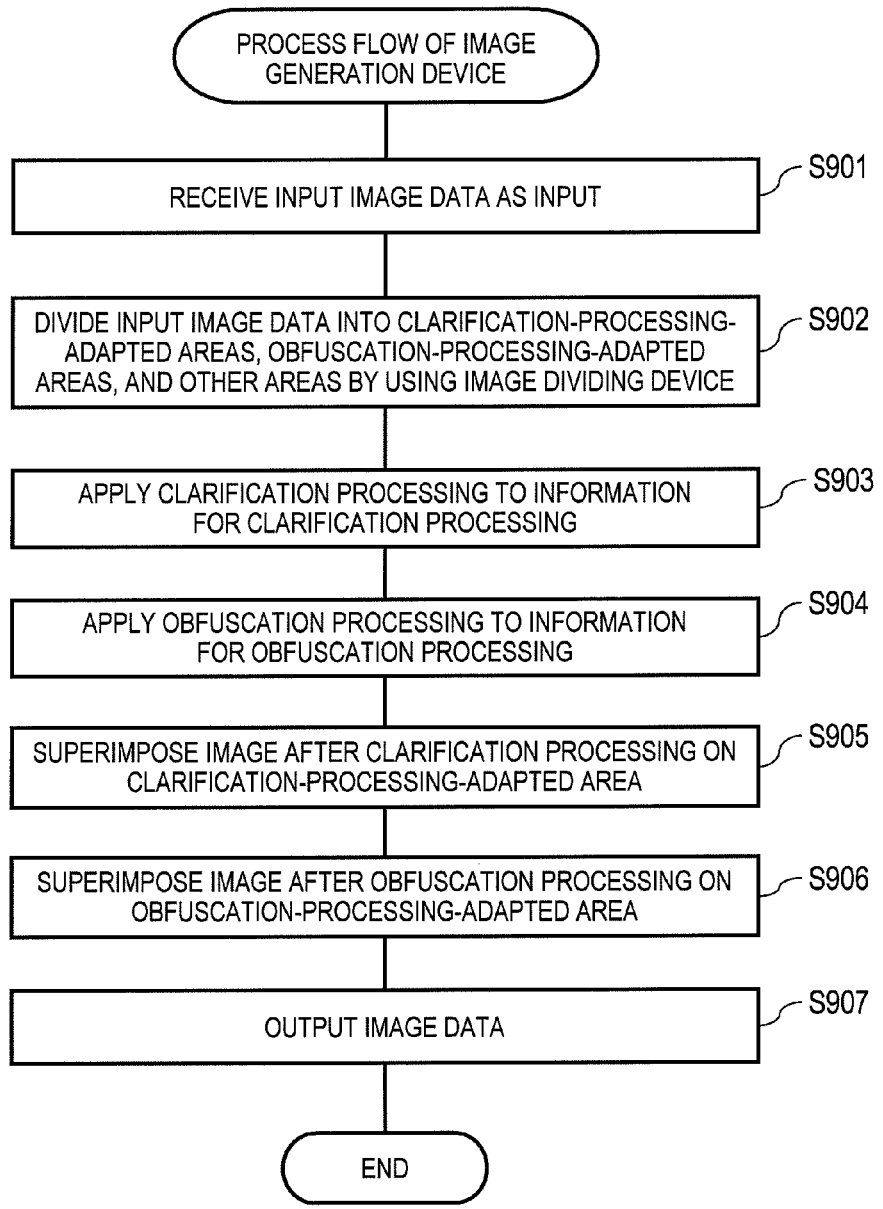
FIG. 9 is a flowchart illustrating a process flow carried out in the image generation device.

FIG. 9 is a flowchart illustrating a process flow carried out in the image generation device 101.

In Step S901, the image generation device 101 receives input image data 107 as an input. As described above, still image data such as those in JPEG, PNG, PDF, and TIFF formats and the like, and moving image data such as those in AVI format and the like can be the input image data 107.

In Step S902, the image generation device 101 divides the input image data 107 into the clarification-processing-adapted areas, the obfuscation-processing-adapted areas, and other areas by using the image dividing device 102. The details of this processing are the same as those described above in the description of the image dividing device 102.

In Step S903, the image generation device 101 applies the clarification processing to the information for clarification processing 108 by using the clarification processing device 104, thereby generating an image after clarification processing. This processing is described in detail later.

In Step S904, the image generation device 101 applies the obfuscation processing to the information for obfuscation processing 109 by using the obfuscation processing device 105, thereby generating an image after obfuscation processing. This processing is described in detail later.

In Step S905, the image generation device 101 superimposes the image after clarification processing created in Step S903 on the clarification-processing-adapted area of the input image data 107 by using the image superimposition device 106. This processing is described in detail later.

In Step S906, the image generation device 101 superimposes the image after obfuscation processing created in Step S904 on the obfuscation-processing-adapted area of the input image data 107 by using the image superimposition device 106. This processing is described in detail later.

In Step S907, the image generation device 101 outputs the image data acquired by the processing in Step S906 as the output image data 112. The format of the output image data 112 is the same as the format of the input image data 107.

It should be noted that the processing of Steps S901, S902, S903, S905, and S907 in the process flow should be carried out in the stated order. Similarly, the processing of Steps S901, S902, S904, S906, and S907 in the process flow should be carried out in the stated order.

When the input image data 107 is a moving image, and the processing is carried out per GOP, in the above-mentioned two orders, Step S907, for example, for a previous GOP may be carried out before Step S901, for example, for a next GOP.

On the other hand, the other orders are arbitrary in the above-mentioned process flow. For example, the order of the processing in Step S903 and the processing in Step S904 may be reversed.

Moreover, in a case where the image is a color image in the above-mentioned process flow, the image may be separated into a brightness component and other components in Step S901, for example, and the processing in Steps S902 to S906 may be applied to the brightness component. In this case, a color image is reconstructed by the brightness component to which the processing up to Step S906 has been applied, and the other components separated in Step S901, and is output in Step S907.

For example, in a case where the input image data is an RGB image, it is possible to extract the brightness component Y from the components of the RGB image in accordance with the following equation (3). On this occasion, $C_b$ and $C_r$, which are the color-difference signals can be acquired as the other components by calculation. Moreover, the respective components of the RGB image can be calculated from the brightness component Y and the color-difference signals $C_b$ and $C_r$ in accordance with the following equation (4). Each of those calculations is carried out for each pixel.

[Math. 3]

$$\begin{bmatrix} Y \\ C_b \\ C_r \end{bmatrix} = \begin{bmatrix} 0.299 & 0.587 & 0.114 \\ -0.168736 & -0.331264 & 0.5 \\ 0.5 & -0.418688 & -0.081312 \end{bmatrix} \begin{bmatrix} R \\ G \\ B \end{bmatrix} \quad (3)$$

[Math. 4]

$$\begin{bmatrix} R \\ G \\ B \end{bmatrix} = \begin{bmatrix} 1 & 0 & 1.402 \\ 1 & -0.344136 & -0.714136 \\ 1 & 1.772 & 0 \end{bmatrix} \begin{bmatrix} Y \\ C_b \\ C_r \end{bmatrix} \quad (4)$$

It should be noted that the color-difference signals $C_b$ and $C_r$ may take negative values in the equations (3) and (4). Moreover, the value after calculation in accordance with the equation (4) is preferably properly adjusted so as to be an integer from 0 to 255 in a typical example. For example, the value after the calculation in accordance with the equation (4) is rounded off, truncated, or rounded up to an integer. Moreover, for example, adjustment of setting the value to 0 when the value after the calculation in accordance with the equation (4) is a negative value, and setting the value to 255 when the value is equal to or more than 256 is carried out.

As described above, the image generation device 101 creates the output image data 112 enhanced in an effect of preventing unauthorized leak.

A description is now given of the clarification processing by the clarification processing device 104.

A copy preventing pattern causing letters "DO NOT COPY" to appear for a printed matter such as a certificate is prevailing. The clarification processing is processing of causing an image created from the information for clarification processing 108, which is described later, to appear on a copied image as the copy preventing pattern when the image is copied.

It should be noted that the image does not appear when the image is simply copied because electronic data thereof are the same. However, scale-down processing is often applied to an image. For example, for a still image, a scaled-down image for a list display called thumbnail may be created. Moreover, for a moving image, the image width and the image height may be reduced for a reduction in data amount. If this processing is applied, the electronic data is different between the image before the scale-down and the image after the scale-down. The clarification processing is carried out by using this difference. In other words, the clarification processing is processing of embedding an image for clarification processing representing information such as "DO NOT COPY" into the image as a latent image, and the embedded image for clarification processing appears when the scale-down processing is applied to the image.

First, a description is now given of the information for clarification processing 108 referring to FIG. 10. FIG. 10 illustrates various examples of the information for clarification processing 108 according to the embodiment of this invention. Item names are described in the first row in FIG. 10. An information type for clarification processing is described in an information type 1001, and an example of the information for clarification processing is described in an example of information for clarification processing 1002.

In FIG. 10, the information for clarification processing 108 is exemplified in the second and subsequent rows. One piece of information for clarification processing 108 is exemplified in one row. For example, information for clarification processing having the information type 1001 of "IMAGE" is described in a row 1003. In this case, a file name of data representing image data such as "/image/hideImage.jpg" is described in the information for clarification processing 108. Based on this file name, the CPU 202 in the clarification processing device 104 transmits a request to an OS, thereby acquiring the image data from the hard disk 208 in the clarification processing device 104.

Moreover, the information having the information type 1001 of "SENTENCE" is described in a row 1004 as an example of another piece of the information for clarification processing 108. In this case, a sentence, a used font name, a size of the used font, and display coordinates, such as "DO NOT COPY", "GOTHIC", 36, (100, 100)", are specified to the information for clarification processing 108. A fact that a sentence "DO NOT COPY" in 36-point gothic font is drawn starting from the coordinates (100, 100) is specified in the example in the row 1004.

Moreover, the information having the information type 1005 of "SCRIPT" is described in a row 1005 as an example of another piece of the information for clarification processing 108. In this case, a script such as "PutString(100, 100), GetDate( )+"for"+GetUserName( ), "MING TYPE", 48" is specified to the information for clarification processing 108. In the example in the row 1005, a result of drawing a date and a user name in 48-point Ming-type font at coordinates (100, 100) constitutes the information for clarification processing. It should be noted that the script is a simple program, and many types of software programs as an execution engine (software program for executing a script) for a script language are generally prevailing. A script language becomes available by storing an arbitrary script execution engine in the hard disk 208 of the clarification processing device 104.

Figure 19:
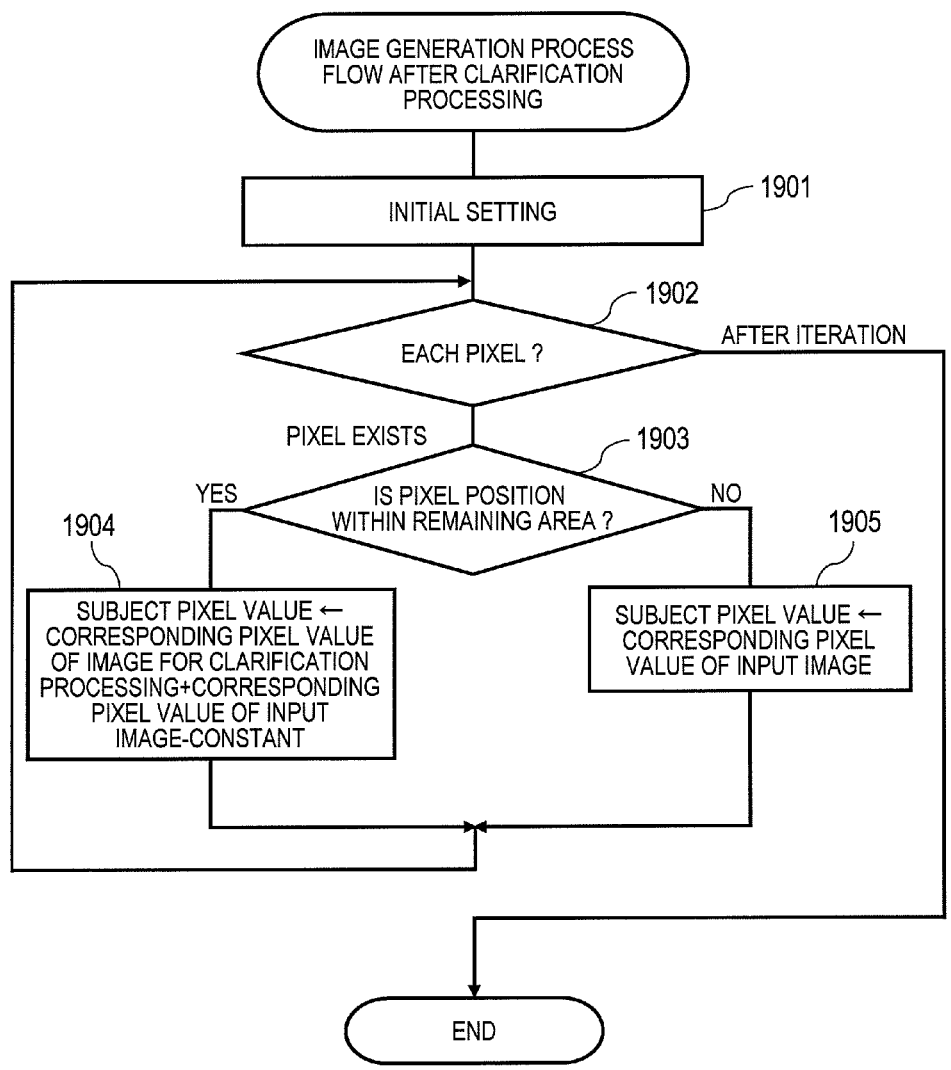
FIG. 19 is a flowchart illustrating details of the clarification processing carried out by a clarification processing device.

FIG. 19 is a flowchart illustrating the clarification processing carried out by the clarification processing device 104, namely detailed processing in Step S903 illustrated in FIG. 9.

In Step S1901, the clarification processing device 104 carries out initial setting. In the initial setting, the clarification processing device 104 reserves an area for the image after clarification processing to be output on the memory 203, and reads the information for clarification processing 108, thereby creating the image for clarification processing.

For example, when the information type 1001 of the information for clarification processing 108 is image, the clarification processing device 104 reads this image data as the image for clarification processing. Moreover, for example, when the information type 1001 of the information for clarification processing 108 is sentence, the clarification processing device 104 creates an image for clarification processing obtained by drawing a sentence in accordance with the information for clarification processing 108. This processing can be carried out through use of functions of the OS. Moreover, for example, when the information type 1001 of the information for clarification processing 108 is script, an image for clarification processing is created by executing a script for the information for clarification processing 108 through use of the script execution engine.

It should be noted that the image for clarification processing is adjusted so as to have the same image width and the image size as those of the input image data 107. The adjustment can be carried out by a method of simply cutting off an oversized portion, or adding white data in a lacking portion, for example. Moreover, an image may be copied so that the same information for clarification processing 108 periodically repeats in the lacking portion.

In Step S1902, the clarification processing device 104 determines whether or not the processing in Step S1904 or Step S1905 is applied to all the pixels of the image for clarification processing created in Step S1901. When the clarification processing device 104 determines that the processing has been applied to all the pixels of the image for the clarification processing, the clarification processing device 104 outputs data generated in the area reserved on the memory 203 for the image after clarification processing as the image after clarification processing, and finishes the clarification processing. On the other hand, when the clarification processing device 104 determines that the processing has not been applied to all the pixels of the image for the clarification processing, the clarification processing device 104 extracts an unprocessed pixel from the image for clarification processing, and proceeds to Step S1903.

In Step S1903, the clarification processing device 104 determines whether or not the pixel extracted in Step S1902 is within a remaining area. Herein, the remaining area refers to an area constituted by, when an image is scaled down at a given scale-down rate, pixels influencing pixel values of an image after the scale-down.

In a case where the nearest-neighbor interpolation method is used as the scale-down processing, there are pixels in the image before the scale-down which do not affect the image after the scale-down. This is because, in the nearest-neighbor interpolation method, an image after the scale-down is constituted by values of a certain number of pixels out of the image before the scale-down, and the number of pixels in the image after the scale-down decreases, compared with the image before the scale-down. Thus, an operation which is intuitively understood as thinning out pixels is carried out.

It is possible to determine whether or not a pixel to be processed (before scale-down) is within a remaining area according to the following equation, provided that (x,y) represents a position of the pixel, a (<1.0) represents a scale-down ratio, c1 and c2 represent integer constants, and int(x) represents a function giving the maximum integer equal to or less than x.

When integers (u,v) which satisfy both $int((2u+1)/2a)+c1=x$ and $int((2u+1)/2a)+c2=y$ exist, and (u,v) is at a pixel position to be contained in the image after the scale-down, the pixel (x,y) is within a remaining area.

It should be noted that the integer constants c1 and c2 take values from 0 to approximately 15, for example, and may be the same value or may be different values. The integer constants c1 and c2 are parameters providing for a case in which a remaining area is translated in parallel, and, as an example, the integer constants c1 and c2 may be changed from 0 to 15 with an increment of 1 in the time direction or the space direction of a moving image, or may be changed by randomly selecting a value therebetween. In this way, even if a remaining area moves in parallel, a portion where a latent image appears can be created. It should be noted that c1 or c2 may take a larger value or a smaller value, for example, 100, −15, or −100. The integer constants c1 and c2 may be stored in advance in the hard disk 208 of the clarification processing device 104 by installation personnel or the like when the clarification processing device 104 is installed.

In Step S1903, when it is determined that the position of pixel to be processed is in a remaining area, the clarification processing device 104 proceeds to Step S1904, and when it is determined that the position of pixel to be processed is not in a remaining area, the clarification processing device 104 proceeds to Step S1905.

In Step S1904, the clarification processing device 104 assigns (corresponding pixel value of image for clarification processing+corresponding pixel value of input image data 107-constant) to a value of the pixel to be processed. The constant is, for example, an average of pixel values of all the pixels of the image for clarification processing. When the calculation result is negative, the value of pixel to be processed is set to 0, and when the calculation result exceeds a permissible maximum value (typically 255) for a pixel value, it is preferred that the pixel value to be processed be set to the maximum value (typically 255).

Moreover, before the assignment to the pixel value of the pixel to be processed, the corresponding pixel value of the image for clarification processing may be changed. For example, an intensity image which has the same size as that of the input image data 107, and in which each pixel takes a value in a range from 0 to 200, for example, is further input to the clarification processing device 104, and a pixel value of a pixel of the intensity image corresponding to a subject pixel of the input image data 107 (a pixel value of a pixel of the intensity image corresponding to a pixel position before the scale-down) is multiplied by a corresponding pixel value of the image for clarification processing, and then divided by 100. The obtained value may serve as a corresponding pixel value of the image for clarification processing when the assignment to a pixel value of a pixel to be processed is carried out. With this configuration, the intensity of a latent image can be set based on the position.

On the other hand, in Step S1905, the clarification processing device 104 assigns the corresponding pixel value of the input image data 107 to a value of the pixel to be processed.

In the above-mentioned processing, it is possible to generate an image after clarification processing which concentrates information on the image for clarification processing on remaining areas, and which does not reflect the information on the image for clarification processing to areas other than the remaining areas.

A description is now given of the clarification processing by the obfuscation processing device 105.

A description is now given of information for obfuscation processing 109 used for the obfuscation processing, referring to FIG. 11. FIG. 11 illustrates various examples of the information for obfuscation processing 109 according to the embodiment. Item names are described in the first row in FIG. 11. An information type for obfuscation processing is described in an information type 1101, and an example of the information for obfuscation processing is described in an example of information for obfuscation processing 1102.

In FIG. 11, the information for obfuscation processing 109 is exemplified starting from the second rows. One piece of information for obfuscation processing 109 is exemplified in one row. For example, information for obfuscation processing having the information type 1101 of "SENTENCE" is described in a row 1103. In this case, very short (typically four characters in Japanese, and eight letters in alphabet) sentence such as "Rent0001" is described in the information for obfuscation processing 109. "Rent0001" means to be lent to a person of the ID number "0001".

Moreover, information for obfuscation processing having the information type 1101 of "INTEGER" is described in a row 1104. In this case, typically, a 64-bit integer such as "0x123456789ABCDEF0" is described in the information for obfuscation processing 109. It should be noted that "0x123456789ABCDEF0" represents a 64-bit integer in the notation of the C language.

Moreover, for example, information for obfuscation processing having the information type 1101 of "SCRIPT" is described in a row 1105. In this case, a script such as "GetDate( )<<32+GetUserID( )" is described in the information for obfuscation processing 109. It should be noted that the script is described above. A 64-bit integer obtained as a result of executing this script constitutes the information for obfuscation processing 109.

A description is now given of the obfuscation processing carried out by the obfuscation processing device 105. This obfuscation processing is typically performed by embedding a digital watermark, which is generally known. The information for obfuscation processing 109 is embedded in the input image data 107 by a method of embedding a digital watermark as described in US 2002/0007403, for example, the content of which is hereby incorporated by reference into this application.

On this occasion, when the input image data 107 is a still image, a digital watermark is directly embedded, thereby generating an image after obfuscation processing. Moreover, when the input image data 107 is a moving image, a digital watermark is embedded into only a frame determined as an obfuscation-processing-adapted area in the divided data 111, thereby generating an image after obfuscation processing. Then, 0 may be assigned to portions which are not determined as the obfuscation-processing-adapted area in the divided data 111.

A description is now given of the processing of Step S905 of FIG. 9 carried out by the image superimposition device 106 out of the superimposition processing carried out by the image superimposition device 106. First, the image superimposition device 106 refers to the divided data 111, and extracts one or a plurality of sections having the classification 1501 of the clarification-processing-adapted area. Then, the image superimposition device 106 extracts area information on the section from the start point/end point information of this section, and replaces input image data 107 in this area by an image of a corresponding area of the image after clarification processing. On this occasion, replacement means an assignment of a pixel value.

It should be noted that when the processing of Step S906 is carried out before the processing of Step S905, "the input image data 107 in this area" to be replaced is the image data after the replacement processing in Step S906.

A description is now given of the processing of Step S906 of FIG. 9 out of the superimposition processing carried out by the image superimposition device 106. First, the image superimposition device 106 refers to the divided data 111, and extracts one or a plurality of sections having the classification 1501 of the obfuscation-processing-adapted area. Then, the image superimposition device 106 extracts area information on the section from the start point/end point information of this section, and replaces image data after the replacement processing in Step S905 in this area by an image of a corresponding area of the image after obfuscation processing. On this occasion, replacement means an assignment of a pixel value.

It should be noted that when the processing of Step S906 is carried out before the processing of Step S905, the input image data 107 in the obfuscation-processing-adapted area is replaced by an image of a corresponding area of the image after obfuscation processing.

The image sectioning processing by the image dividing device 102 provides an effect that it is difficult to remove a result of the obfuscation processing such as the digital watermark, compared with the simple area sectioning (such as sectioning through the use of bit planes), and a description is now given of other effects.

There is also provided an effect that the image quality of the output image data 112 improves, compared with a case where the image sectioning processing is not carried out by the image dividing device 102 and only the clarification processing is carried out by the image generation device 101. The clarification processing has more adverse effects in terms of image quality on the output image data 112, compared with the obfuscation processing. However, it is possible to reduce the adverse effects in terms of the image quality by controlling the image dividing device 102 to carry out the image sectioning processing, and by limiting subjects to which the clarification processing is applied to clarification-processing-adapted area.

For the purpose of using only the above-mentioned effects, the obfuscation-processing-adapted area may be treated in the same way as the other areas, thereby omitting the processing. Moreover, the obfuscation processing device 105 may not be included in the image generation device 101 in the first place, and Step S305 of FIG. 3 may be configured to divide the input image data into clarification-processing-adapted areas and other areas. In this case, the determination result is set to the other area in Step S706 of FIG. 7 and Step S805 of FIG. 8.

According to the above described image generating device of the embodiment, based on the characteristic of the image, the plurality of sections to be processed are classified into at least the clarification-processing-adapted areas for embedding a latent image into the image, and the obfuscation-processing-adapted areas for embedding a digital watermark into the image. As a result, the image can be classified into the area suitable for embedding a latent image, and an area suitable for embedding a digital watermark based on the characteristic of the image.

In particular, appropriate classification processing can be carried out by classifying a plurality of sections to be processed into clarification-processing-adapted areas and obfuscation-processing-adapted areas based on the frequency characteristic of an image. Specifically, an area having a large number of high frequency components is classified into an obfuscation-processing-adapted area, and it is thus possible to prevent visibility of an image from degrading by applying the obfuscation processing to the obfuscation-processing-adapted area. Moreover, an area having a large number of low frequency components is classified into a clarification-processing-adapted area, and it is thus possible to cause a latent image to effectively appear when the scale-down processing is applied to an image in which the clarification processing is applied to the clarification-processing-adapted area.

Appropriate classification processing can be carried out by carrying out convolution of image data and template data for partial characteristic determination for each of a plurality of sections to be processed, and classifying the plurality of sections to be processed into the clarification-processing-adapted area and the obfuscation-processing-adapted area based on a result of the convolution.

If the image is a still image, the still image is sectioned into the plurality of sections to be processed. If the image is a moving image constituted by a plurality of frames, a part of the plurality of frames contained in the moving image is extracted as the plurality of sections to be processed. Moreover, in a case of a moving image constituted by a plurality of frames, some of the plurality of frames constituting the moving image are extracted, and each of the extracted frames may be sectioned into a plurality of sections to be processed. As a result of the processing, irrespective of whether an image is a still image or a moving image, the image can be classified into a clarification-processing-adapted area and an obfuscation-processing-adapted area.

An image generation device of an embodiment embeds the latent image into the clarification-processing-adapted area, and embeds the digital watermark into the obfuscation-processing-adapted area. As a result, when the scale-down processing is applied to an image, it is possible to cause a latent image to effectively appear. Moreover, it is possible to make removal of a latent image and a digital watermark by a third person difficult by embedding the latent image and the digital watermark in the areas based on the characteristic of the image.

The embodiments of this invention have been described in detail referring to drawings, but the specific configuration is not limited to these embodiments and may include other designs without departing from the gist of this invention.

What is claimed is:

1. An image processing device, comprising:
    a sectioning device configured to section an image into a plurality of sections to be processed;
    a classification device configured to classify the plurality of sections to be processed into at least a clarification-processing-adapted area for embedding a latent image into the image, and an obfuscation-processing-adapted area for embedding a digital watermark into the image based on a characteristic of the image;
    a latent image embedding device configured to embed the latent image into the clarification-processing-adapted area;
    a digital watermark embedding device configured to embed the digital watermark into the obfuscation-processing-adapted area; and
    a clarification processing device configured to determine whether a pixel position is within a remaining area, and on a condition that it is determined that the pixel position is within the remaining area, the clarification processing device is further configured to assign a value to a pixel corresponding to the pixel position, wherein the assigned value corresponds to a pixel value for clarification processing and a pixel value for input image data.

2. The image processing device according to claim 1, wherein the classification device classifies the plurality of sections to be processed into the clarification-processing-adapted area and the obfuscation-processing-adapted area based on a frequency characteristic of the image.

3. The image processing device according to claim 1, wherein the classification device carries out convolution of image data and template data for partial characteristic determination for each of the plurality of sections to be processed, and classifies the plurality of sections to be processed into the clarification-processing-adapted area and the obfuscation-processing-adapted area based on a result of the convolution.

4. The image processing device according to claim 1, wherein:
    the image is a still image; and
    the sectioning device sections the still image into the plurality of sections to be processed.

5. The image processing device according to claim 1, wherein:
    the image is a moving image containing a plurality of frames; and
    the sectioning device extracts a part of the plurality of frames contained in the moving image as the plurality of sections to be processed.

6. The image processing device according to claim 1, wherein:
    the image is a moving image containing a plurality of frames; and
    the sectioning device extracts a part of the plurality of frames contained in the moving images, and sections each of the extracted frames into a plurality of sections to be processed.

7. An image processing method, comprising:
    sectioning an image into a plurality of sections to be processed;

classifying the plurality of sections to be processed into at least a clarification-processing-adapted area for embedding a latent image into the image, and an obfuscation-processing-adapted area for embedding a digital watermark into the image based on a characteristic of the image;

embedding the latent image into the clarification-processing-adapted area; and embedding the digital watermark into the obfuscation-processing-adapted area; and determining whether a pixel position is within a remaining area, and on a condition that it is determined that the pixel position is within the remaining area, assigning a value to a pixel corresponding to the pixel position, wherein the assigned value corresponds to a pixel value for clarification processing and a pixel value for input image data.

8. The image processing method according to claim 7, wherein the classifying comprises classifying the plurality of sections to be processed into the clarification-processing-adapted area and the obfuscation-processing-adapted area based on a frequency characteristic of the image.

9. The image processing method according to claim 7, wherein the classifying comprises carrying out convolution of image data and template data for partial characteristic determination for each of the plurality of sections to be processed, and classifying the plurality of sections to be processed into the clarification-processing-adapted area and the obfuscation-processing-adapted area based on a result of the convolution.

10. The image processing method according to claim 7, wherein:
the image is a still image; and
the sectioning comprises sectioning the still image into the plurality of sections to be processed.

11. The image processing method according to claim 7, wherein:
the image is a moving image containing a plurality of frames; and
the sectioning comprises extracting a part of the plurality of frames contained in the moving image as the plurality of sections to be processed.

12. The image processing method according to claim 7, wherein:
the image is a moving image containing a plurality of frames; and
the sectioning comprises extracting a part of the plurality of frames contained in the moving images, and sectioning each of the extracted frames into the plurality of sections to be processed.

13. An image generation method, comprising:
sectioning an image into a plurality of sections to be processed;

classifying the plurality of sections to be processed into at least a clarification-processing-adapted area for embedding a latent image into the image, and an obfuscation-processing-adapted area for embedding a digital watermark into the image based on a characteristic of the image;

embedding the latent image into the clarification-processing-adapted area;

embedding the digital watermark into the obfuscation-processing-adapted area; and determining whether a pixel position is within a remaining area, and on a condition that it is determined that the pixel position is within the remaining area, assigning a value to a pixel corresponding to the pixel position, wherein the assigned value corresponds to a pixel value for clarification processing and a pixel value for input image data.

* * * * *